US006792438B1

(12) United States Patent
Wells et al.

(10) Patent No.: US 6,792,438 B1
(45) Date of Patent: Sep. 14, 2004

(54) SECURE HARDWARE RANDOM NUMBER GENERATOR

(75) Inventors: Steven E. Wells, El Dorado Hills, CA (US); V. Niles Kynett, El Dorado Hills, CA (US); Lance W. Dover, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,915

(22) Filed: Mar. 31, 2000

(51) Int. Cl.[7] .................................................. G06F 1/02
(52) U.S. Cl. ......................................................... 708/250
(58) Field of Search .............................. 708/250–256; 380/46

(56) References Cited

U.S. PATENT DOCUMENTS

| | | | |
|---|---|---|---|
| 3,790,768 A | 2/1974 | Chevalier et al. | |
| 4,578,649 A | 3/1986 | Shupe | |
| 4,694,412 A | 9/1987 | Domenik et al. | |
| 4,791,594 A | 12/1988 | Harney et al. | |
| 4,810,975 A | 3/1989 | Dias | |
| 4,855,690 A | 8/1989 | Dias | |
| 5,007,087 A | 4/1991 | Bernstein et al. | |
| 5,473,692 A | 12/1995 | Davis | |
| 5,539,828 A | 7/1996 | Davis | |
| 5,568,552 A | 10/1996 | Davis | |
| 5,627,775 A | 5/1997 | Hong et al. | |
| 5,706,218 A | 1/1998 | Hoffman | |
| 5,778,070 A | 7/1998 | Mattison | |
| 5,781,458 A | 7/1998 | Gilley | |
| 5,805,712 A | 9/1998 | Davis | |
| 5,828,753 A | 10/1998 | Davis | |
| 5,835,594 A | 11/1998 | Albrecht et al. | |
| 5,844,925 A | 12/1998 | Dent | |
| 5,844,986 A | 12/1998 | Davis | |
| 5,871,400 A * | 2/1999 | Yfantis ...................... | 708/250 |
| 6,026,016 A | 2/2000 | Gafken | |
| 6,061,702 A | 5/2000 | Hoffman | |
| 6,104,811 A | 8/2000 | Aiello et al. | |
| 6,193,607 B1 * | 2/2001 | Kay ........................... | 708/250 |
| 6,195,433 B1 | 2/2001 | Vanstone et al. | |
| 6,209,098 B1 | 3/2001 | Davis | |
| 6,324,558 B1 * | 11/2001 | Wilber ....................... | 708/255 |
| 6,480,072 B1 * | 11/2002 | Walsh et al. ................ | 708/250 |
| 6,480,869 B1 * | 11/2002 | Fujioka ...................... | 708/252 |

FOREIGN PATENT DOCUMENTS

| | | |
|---|---|---|
| DE | 4006251 C1 | 4/1991 |
| WO | WO 00/59153 A2 | 10/2000 |
| WO | WO 00/59153 A3 | 1/2001 |

OTHER PUBLICATIONS

Blum, M., "Independent Unbiased Coin Flips from a Correlated Biased Source—A Finite State Markov Chain," Combinatorica, vol. 6, No. 2, pp. 97–108 (1986).

Chor, Benny, et al., "Unbiased Bits from Sources of Weak Randomness and Probabilistic Communication Complexity," SIAM Journal on Computing, vol. 17, No. 2, pp. 230–261 (Apr. 1988).

Cooper, J. Arlin, Computer Security, pp. 2072–2086 (published prior to Mar. 31, 1999).

Fairfield, R.C., et al., "An LSI Random Number Generator (RNG)," published in Proceedings in Advances in Cryptology Conference on CRYPTO, pp. 203–215 (1984).

(List continued on next page.)

Primary Examiner—Tan V. Mai
(74) Attorney, Agent, or Firm—Blakely, Sokoloff, Taylor & Zafman LLP

(57) ABSTRACT

A random number generator comprises random number generation circuitry to generate and output random bits. The random number generator includes interface circuitry to receive and store random bits output by the random number generation circuitry and to output random bits. The interface circuitry prevents outputting the same random bits more than once.

24 Claims, 4 Drawing Sheets

OTHER PUBLICATIONS

Gude, Michael, "Concept for a High Performance Random Number Generator Based on Physical Random Phenomena," Frequenz, 39, pp. 187–190 (Jul./Aug. 1985).

Murry, Herschell F., "A General Approach for Generating Natural Random Variables," IEEE Transactions on Computers, pp. 1210–1213 (Dec. 1970).

Santha, Miklos, et al., "Generating Quasi–Random Sequences from Slightly–Random Sources," Proceedings of the 25th Annual Symposium on Foundations of Computer Science, pp. 434–440 (Oct. 24–26, 1984).

Santha, Miklos, et al., "Generating Quasi–random Sequences from Semi–random Sources," Journal of Computer and System Sciences, vol. 33, No. 1, pp. 75–87 (Aug. 1986).

von Neumann, John, "Various Techniques Used in Connection With Random Digits," Applied Mathematics Series, vol. 12, United States Department of Commerce, National Bureau of Standards, pp. 36–38 (Jun. 11, 1951).

Shift Registers, pp. 1725–1727 (published prior to Mar. 31, 1999).

U.S. patent application No. 09/283,096, filed Mar. 31, 1999, entitled Duty Cycle Corrector for a Random Number Generator, by Steven E. Wells and David A. Ward.

U.S. patent application No. 09/283,769, filed Mar. 31, 1999, entitled Programmable Random Bit Source, by Steven E. Wells.

Schneier, Bruce, Applied Cryptography, John Wiley & Sons, Inc., pp. vii–xiv and 369–395 (2nd Ed., 1996).

U.S. patent application No. 09/541,375, filed Mar. 31, 2000, entitled Random Number Generator with Entropy Accumulation, by Steven E. Wells and David A. Ward.

U.S. patent application No. 09/752,088, filed Dec. 29, 2000, entitled Integrated Circuit Chip Having Firmware and Hardware Security Primitive Device(s), by Steven E. Wells and V. Niles Kynett.

\* cited by examiner

SECURE HARDWARE RANDOM NUMBER GENERATOR

BACKGROUND OF THE INVENTION

1. Field of the Invention

The present invention relates generally to the field of computer systems. More particularly, the present invention relates to the field of random number generators for use by computer systems.

2. Description of Related Art

Random number generators may be used for a variety of electronic applications, such as lotteries, gambling machines, video games, image processing and reconstruction, music and graphics composition, scientific and financial modeling simulation, program and algorithm testing, equation-solving, and computer security for example. For computer security applications such as cryptography, digital signatures, and protected communication protocols, for example, random numbers are a fundamental building block for strengthening and securing the confidentiality of electronic communications.

Cryptography is the art and science of keeping messages secure and involves authentication, confidentiality, and integrity.

Authentication involves ensuring each entity communicating with one another is who the other entity or entities think it is. For an exemplary authentication protocol, a client requests access over a network to password protected information stored on a server. The server responds with a random challenge, such as a random number possibly combined with other information. The client encrypts the random challenge using its password as a key and returns the encrypted challenge to the server. The server encrypts the same random challenge with the client's password which the server obtains from its own password database. The server compares the two results. If the results match, the server has authenticated the client without the client ever sending its password over the network. Random number generation is therefore critical to help ensure no unauthorized entity observing an encrypted random challenge can impersonate the client by similarly responding to new random challenges.

Confidentiality involves ensuring that no unauthorized entity listening to a communication is able to extract meaningful information. Confidentiality is typically provided through data encryption which is the process of combining the original message with a cryptographic key in a well-defined manner to encrypt the message. In an ideal cryptosystem, only an entity with a decryption key can decrypt the encrypted message. By ensuring that the decryption key cannot be predicted or replicated and that only the intended recipient of the message has the required decryption key, the message can be protected from observation by an unauthorized entity. Cryptographic keys can be symmetric or asymmetric. Symmetric keys are used for both encrypting and decrypting data. Asymmetric keys are produced in pairs, each pair consisting of a public key to encrypt data and a private key to decrypt data. The strength of a cryptosystem lies in the strength of the key which is a function of not only the number of bits in the key but also the randomness of the number used to generate the key. Random number generation is therefore critical to help ensure the confidentiality of a message.

Integrity involves ensuring no undetected changes are made to a communication. Digital signatures help maintain the integrity of a message. A digital signature is a fixed-length binary string unique to a given message and signed with a private key. The unique string is known as a message digest or cryptographic hash. Because the unique string is signed with the originator's private key, any entity with the originator's public key can decrypt the message and know the owner of the private key originated the message. By generating another hash of the message using the same hashing algorithm as the originator and comparing the new hash with the signed hash, the recipient can verify that the message did not change after leaving the originator. Random number generation is critical to the strength of a signature generated using random numbers to avoid forgery of the signature.

Random numbers are a sequence of independent numbers with a specified distribution and a specified probability of falling in any given range of values. An ideal random number generator provides a stream of uniformly distributed, non-deterministic, independent bits over an infinite data set.

Typical computer programs use software random number generators as a random number generator may then be added to a computer system with relative ease. Software random number generators typically require a seed which is used as an operand in a mathematical algorithm to create a random number. The sequence of numbers generated by such software random number generators will eventually repeat, however, and are therefore better characterized as pseudo random numbers. Incorporating randomness into the seed and using sufficiently long mathematical computations help to generate numbers with relatively more randomness. Typically, the seed is generated from bits of data collected from the computer system, such as the clock, running processes, status registers, keystrokes, key press timing, and mouse movements, for example. System interrupt and event handling within different computer systems, however, may reduce the effective randomness of at least some of these seed sources.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for a secure hardware random number generator. In the following description, details are set forth such as specific random bit sources, techniques, etc., in order to provide a thorough understanding of the present invention. It will be evident, however, that the present invention may be practiced without these details. In other instances, well-known computer and electronic components, etc., have not been described in particular detail so as not to obscure the present invention.

Exemplary Computer System

Figure 1:
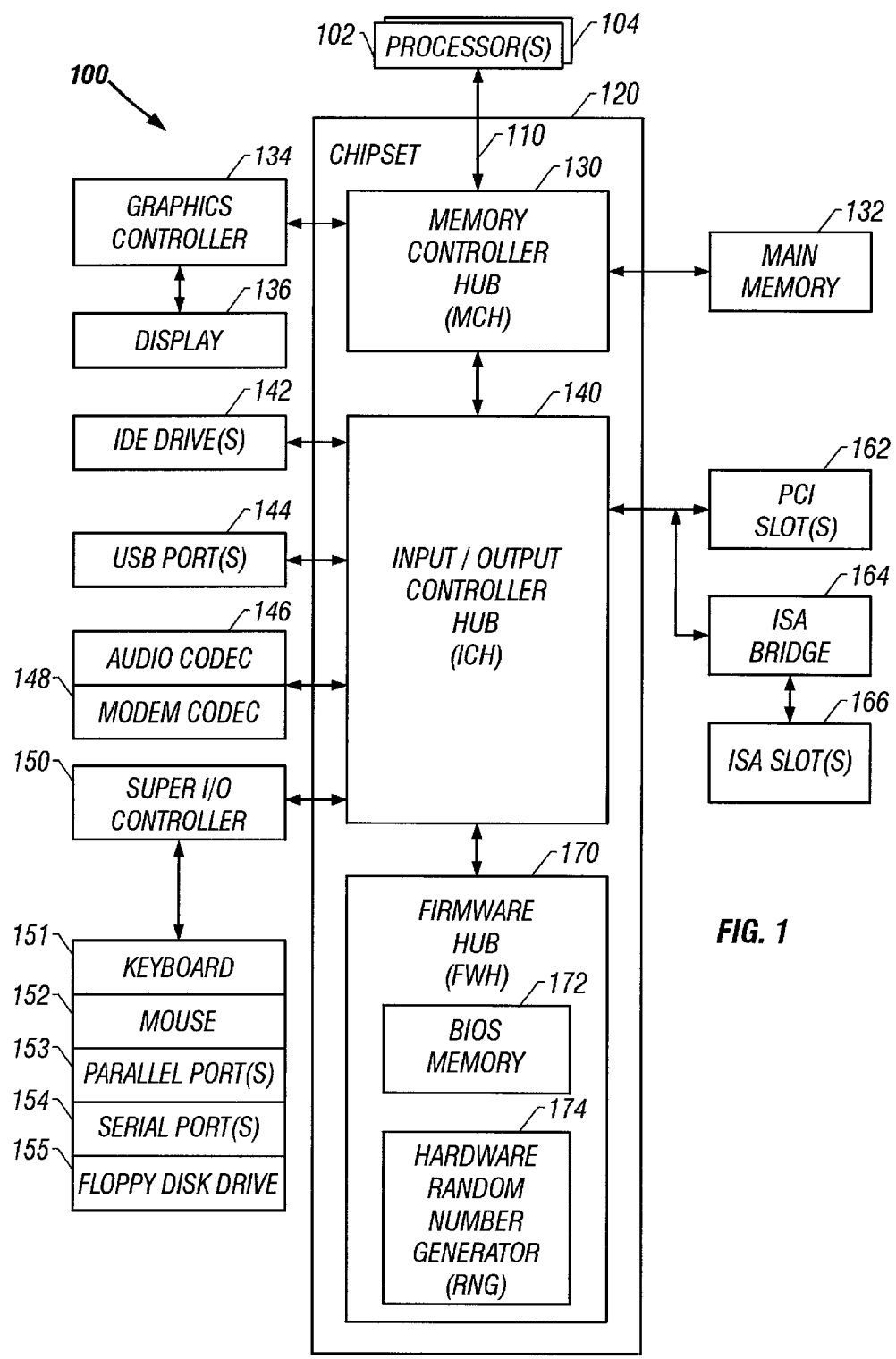
FIG. 1 illustrates an exemplary computer system having a hardware random number generator.

FIG. 1 illustrates an exemplary computer system 100 having a hardware random number generator (RNG) 174 in accordance with the present invention. Although described in the context of computer system 100, the present invention may be implemented in any suitable computer system comprising any suitable one or more integrated circuits.

As illustrated in FIG. 1, computer system 100 comprises processors 102 and 104, a processor bus 110, and a chipset 120. Processors 102 and 104 and chipset 120 are coupled to processor bus 110. Processors 102 and 104 may each comprise any suitable processor such as, for example, a processor in the Pentium® or Celeron™ family of processors available from Intel® Corporation of Santa Clara, Calif. Computer system 100 for other embodiments may comprise one, three, or more processors.

Chipset 120 for one embodiment comprises a memory controller hub (MCH) 130, an input/output (I/O) controller hub (ICH) 140, and a firmware hub (FWH) 170. MCH 130, ICH 140, and FWH 170 may each comprise any suitable circuitry and for one embodiment are each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. For one embodiment where system 100 comprises only one processor 102, processor 102 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

MCH 130 is also coupled to ICH 140 to provide access to ICH 140 through a hub interface. ICH 140 provides an interface to I/O devices or peripheral components for computer system 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 comprises a basic input/output system (BIOS) memory 172 to store suitable system and/or video BIOS software. BIOS memory 172 may comprise any suitable non-volatile memory, such as a flash memory for example.

FWH 170 also comprises hardware random number generator (RNG) 174 to generate random bits to form random numbers, for example. Processor 102 and/or processor 104 may use random bits generated by RNG 174 for any suitable purpose or application, such as for lotteries, gambling machines, video games, image processing and reconstruction, music and graphics composition, scientific and financial modeling simulation, program and algorithm testing, equation-solving, and computer security applications such as cryptography, digital signatures, and protected communication protocols, for example. Processor 102 and/or processor 104 may access one or more random bits generated by RNG 174 through MCH 130 and ICH 140.

Although RNG 174 is described as integrated with FWH 170, RNG 174 for other embodiments may be implemented as a separate component or chip or integrated with any other suitable integrated circuit device.

Hardware Random Number Generator

RNG 174 generates and enables access to one or more random bits for computer system 100. RNG 174 may comprise any suitable circuitry to generate and enable access to random bits.

Figure 2:
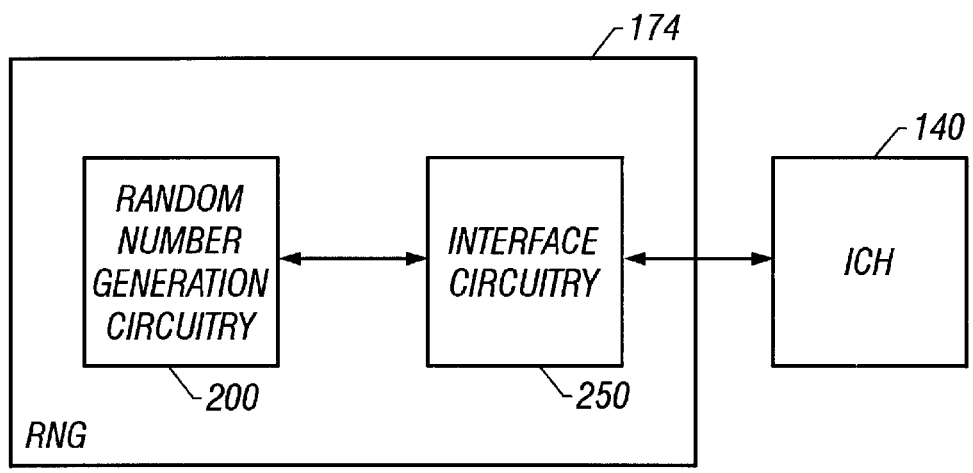
FIG. 2 illustrates, for one embodiment, a hardware random number generator in block diagram form.

RNG 174 for one embodiment comprises random number generation circuitry 200 and interface circuitry 250 as illustrated in FIG. 2. Random number generation circuitry 200 generates and outputs random bits to interface circuitry 250. Interface circuitry 250 controls access to random bits output from random number generation circuitry 200.

Figure 3:
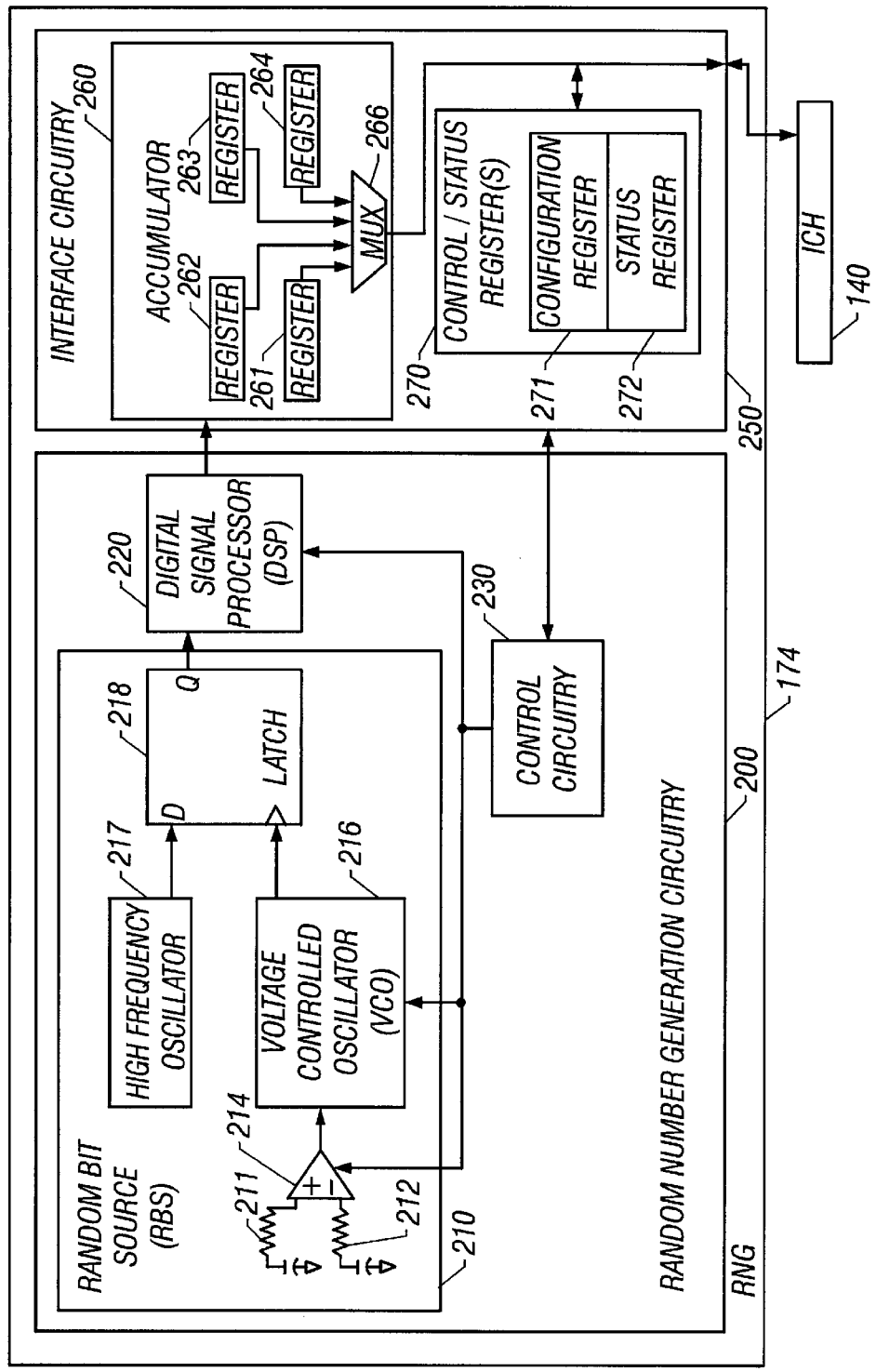
FIG. 3 illustrates, for one embodiment, circuitry for a hardware random number generator.

Random number generation circuitry 200 may comprise any suitable circuitry to generate and output random bits. Random number generation circuitry 200 for one embodiment comprises a random bit source (RBS) 210, a digital signal processor (DSP) 220, and control circuitry 230 as illustrated in FIG. 3. RBS 210 generates and outputs random bits to DSP 220, and DSP 220 processes the random bits output from RBS 210 to generate and output processed random bits to interface circuitry 250. RBS 210 and DSP 220 generate and output random bits under control of control circuitry 230.

RBS 210 may comprise any suitable circuitry, including suitable analog and/or suitable digital circuitry, and/or any suitable one or more devices to generate and output random bits using any suitable random source, such as semiconductor or thermal noise for example. As illustrated in FIG. 3, RBS 210 for one embodiment comprises resistors 211 and 212, a differential amplifier 214, a relatively low frequency voltage controlled oscillator (VCO) 216, a relatively high frequency oscillator 217, and a D-type latch 218.

High frequency oscillator 217 generates and outputs a relatively high frequency digital oscillating signal at an output coupled to a D input terminal of D-type latch 218. High frequency oscillator 217 may operate at any suitable nominal frequency. VCO 216 generates and outputs a relatively low frequency digital oscillating signal at an output coupled to a clock input terminal of D-type latch 218. VCO 216 may operate at any suitable nominal frequency. D-type latch 218 samples the signal generated by high frequency oscillator 217 at a frequency determined by VCO 216 to generate and output a sequence of bit signals or bits at a Q output terminal of D-type latch 218.

The frequency of operation of VCO 216 is controlled by a voltage signal generated and output by differential amplifier 214. The voltage signal is developed from noise from resistors 211 and 212. Resistors 211 and 212 for one embodiment are each fabricated from an n-well in silicon and therefore generate noise due to the inherently random quantum mechanical properties of silicon. Resistors 211 and 212 for one embodiment have approximately the same value of resistance.

Resistor 211 is coupled between a non-inverting input terminal of differential amplifier 214 and a ground terminal. A capacitor is coupled in series between resistor 211 and the ground terminal. Resistor 212 is coupled between an inverting input terminal of differential amplifier 214 and a ground terminal. A capacitor is coupled in series between resistor 212 and the ground terminal. Differential amplifier 214 applies a suitable current through each resistor 211 and 212, incurring a voltage across each resistor 211 and 212. Differential amplifier 214 amplifies the difference in voltage at its input terminals to generate and output the voltage signal at an output coupled to an input terminal of VCO 216. Because this voltage difference varies based on the noise generated within each resistor 211 and 212, VCO 216 generates and outputs a digital oscillating signal at a random frequency. The bits output by D-type latch 218 are therefore random.

The Q output terminal of D-type latch 218 is coupled to an input terminal of DSP 220. DSP 220 processes the sequence of random bits output from D-type latch 218 to generate and output processed random bits to interface circuitry 250. DSP 220 may comprise any suitable circuitry to process random bits generated and output by RBS 210 in any suitable manner. DSP 220 for one embodiment processes random bits to accumulate entropy or randomness in the random bits output from RBS 210. DSP 220 for one embodiment comprises a linear feedback shift register (LFSR) configured to accumulate entropy in the random bits output from RBS 210.

Control circuitry 230 is coupled to RBS 210 and DSP 220 and controls the generation and output of random bits by RBS 210 and DSP 220. Control circuitry 230 may comprise any suitable circuitry to control the generation and output of random bits by RBS 210 and DSP 220 in any suitable manner. Control circuitry 230 for one embodiment selectively enables and disables RBS 210 and DSP 220 to generate and output random bits only as desired or needed to help minimize power consumption by random number generation circuitry 200.

As illustrated in FIG. 3, control circuitry 230 for one embodiment selectively generates and outputs an enable signal to differential amplifier 214 to enable and disable the generation and output of voltage signals by differential amplifier 214. Control circuitry 230 for one embodiment also selectively generates and outputs an enable signal to VCO 216 to enable and disable the generation and output of oscillating signals by VCO 216. Control circuitry 230 for one embodiment further selectively generates and outputs an enable signal to DSP 220 to enable and disable the generation and output of processed random bits by DSP 220.

Random number generation circuitry 200 is implemented in hardware and is therefore inherently less prone to security violations as compared to software implemented random number generators. Also, for embodiments where random number generation circuitry 200 uses noise in a semiconductor junction, such as in a resistor or diode for example, random number generation circuitry 200 generates random bits with relatively more randomness as random number generation circuitry 200, unlike typical software implemented random number generators, generates random bits that do not rely on predictable data collected from the computer system, that do not eventually repeat in a predictable manner, and that are not susceptible to intrusion or exposure by algorithm disassembly or disclosure.

For embodiments where random number generation circuitry 200 uses properties native to silicon circuitry as a source of randomness, such as RBS 210 as illustrated in FIG. 3 for example, RNG 174 may be integrated with any suitable integrated circuit device, such as with processor 102 of computer system 100 or with FWH 170 as illustrated in FIG. 1 for example. For embodiments where random number generation circuitry 200 also uses analog circuitry, such as RBS 210 as illustrated in FIG. 3 for example, RNG 174 may be integrated with any suitable integrated circuit device comprising flash memory as analog circuitry fits relatively well within the well-characterized flash process and the unpredictable behavior of RBS 210 works relatively well with a flash-based tester as compared to a vector logic tester. RNG 174 for one embodiment is integrated with FWH 170 where FWH 170 uses flash memory for BIOS memory 172.

Hardware Random Number Generator Interface

Interface circuitry 250 is coupled to random number generation circuitry 200 and receives and stores random bits from random number generation circuitry 200. Interface circuitry 250 provides an interface to enable access to random bits. Interface circuitry 250 may comprise any suitable circuitry to receive and store random bits from random number generation circuitry 200 and to provide an interface to enable access to random bits.

As illustrated in FIG. 3, interface circuitry 250 for one embodiment comprises an accumulator 260 and one or more control and/or status (control/status) registers 270. Accumulator 260 receives and stores random bits output from random number generation circuitry 200 and outputs stored random bits. Control/status register(s) 270 help control the generation and reading of random bits from RNG 174.

Accumulator 260 may comprise any suitable memory circuitry to receive and store random bits output by random number generation circuitry 200 in any suitable manner. Accumulator 260 may, for example, comprise one or more registers of any suitable size to receive and store random bits output from random number generation circuitry 200 in any suitable manner. Accumulator 260 for one embodiment comprises a plurality of registers 261, 262, 263, and 264. Although illustrated in FIG. 3 as comprising four registers 261–264, accumulator 260 may comprise any other suitable number of registers. Each register 261–264 may store up to any suitable number of random bits, such as eight for example.

Registers 261–264 for one embodiment are shift registers coupled in a serial configuration, effectively forming one larger shift register. Accumulator 260 serially receives each random bit from random number generation circuitry 200 in the least significant bit position of register 261, the least significant register, and shifts each random bit previously stored in register 261 to the next more significant bit position of register 261. The random bit previously stored in the most significant bit position of register 261 is shifted to the least significant bit position of register 262, the next more significant register. Random bits previously stored in registers 262–264 are similarly shifted to more significant bit positions, with each random bit stored in the most significant bit position of registers 262 and 263 being shifted to the least significant bit position of registers 263 and 264, respectively. Accumulator 260 for one embodiment receive stand stores random bits in this manner until each register 261–264 is full.

For another embodiment where registers 261–264 are shift registers coupled in a serial configuration, accumulator 260 receives and shifts random bits from most to least significant bit positions of registers 264–261.

Accumulator 260 may comprise any suitable circuitry to output stored random bits in any suitable manner. As illustrated in FIG. 3, accumulator 260 for one embodiment comprises a multiplexer (MUX) 266 to help control the output of random bits from each register 261–264, one register at a time. Accumulator 260 may control MUX 266 to output random bits from registers 261–264 in any suitable order. Accumulator 260 for one embodiment controls MUX 266 to output random bits from register 264, then from register 263, then from register 262, and then from register 261. Registers 261–264 may output random bits in a serial or parallel manner.

For other embodiments, accumulator 260 may comprise suitable circuitry to fill each register 261–264 one register at a time with serially received random bits. Accumulator 260 may then control the output of random bits from any one register while another register is being filled. As one example, accumulator 260 may fill register 264 with received random bits and then start filling register 263 with random bits while controlling MUX 266 to output the random bits from register 264.

Control/status register(s) 270 may comprise any suitable one or more registers to help control the generation and reading of random bits from RNG 174. Control/status register(s) 270 for one embodiment comprise a RNG configuration register 271 and a RNG status register 272 as illustrated in FIG. 3.

RNG configuration register 271 is used to indicate whether RNG 174 is present and, if so, whether RNG 174 is enabled for use, active, and/or running continuously. The bits of RNG configuration register 271 may be defined in any suitable manner and for one embodiment are defined as follows.

indicate RBS 210 is active and set to logical zero to indicate RBS 210 is inactive. RNG status bit 7 may be used by processor 102, for example, for power management of computer system 100 and/or RNG 174.

RNG present bit 6 indicates whether RNG 174 is present. For one embodiment, RNG present bit 6 is set to logical one to indicate RNG 174 is present and set to logical zero to indicate RNG 174 is absent. RNG present bit 6 for one embodiment is set at manufacture using a metal mask, for example, to indicate RNG 174 is present.

RBS run continuous bit 1 indicates whether RBS 210 generates random bits continuously or only as desired or needed. For one embodiment, RBS run continuous bit 1 is set to logical one to indicate RBS 210 is generating random bits continuously and set to logical zero to indicate RBS 210 is generating random bits only as desired or needed.

RNG enable bit 0 indicates whether RNG 174 is enabled. For one embodiment, RNG enable bit 0 is set to logical one to indicate RNG 174 is enabled and set to logical zero to indicate RNG 174 is disabled.

RNG configuration register 271 for one embodiment has a default value of 40 h, that is only RNG present bit 6 is set to logical one while all other bits are set to logical zero, and is set to the default value upon reset of RNG 174. Interface circuitry 250 for one embodiment allows read and write access to RNG configuration register 271.

RNG configuration register 271 for other embodiments may comprise fewer bits, such as only the RNG present bit and the RNG enable bit for example, and/or may comprise other suitable bits to help control the generation of random bits from RNG 174.

Control circuitry 230 for one embodiment is coupled to interface circuitry 250 and interfaces with interface circuitry 250 to help control the generation and reading of random bits from RNG 174 using the bits of RNG configuration register 271.

Control circuitry 230 for one embodiment enables RBS 210 and DSP 220 to generate and output random bits to interface circuitry 250 when RNG enable bit 0 of RNG configuration register 271 is set to enable RNG 174. Control circuitry 230 and/or interface circuitry 250 may then set RNG status bit 7 of RNG configuration register 271 to indicate RBS 210 is active.

Interface circuitry 250 for one embodiment signals to control circuitry 230 to disable RBS 210 and DSP 220 to help minimize power consumption by random number generation circuitry 200 when interface circuitry 250 has stored a suitable predetermined number of unread random bits, such as the maximum number of random bits that may be stored by interface circuitry 250 for example. Control circuitry 230 and/or interface circuitry 250 may then set RNG status bit 7 of RNG configuration register 271 to indicate RBS 210 is inactive.

TABLE 1

| RNG Configuration Register | | | | | | | |
| --- | --- | --- | --- | --- | --- | --- | --- |
| Bit 7 | Bit 6 | Bit 5 | Bit 4 | Bit 3 | Bit 2 | Bit 1 | Bit 0 |
| RNG status | RNG present | Reserved | Reserved | Reserved | Reserved | RBS run continuous | RNG enable |

RNG status bit 7 indicates whether RBS 210 is active, that is generating random bits, or is inactive. For one embodiment, RNG status bit 7 is set to logical one to As or when unread random bits stored by interface circuitry 250 are output, interface circuitry 250 may signal control circuitry 230 to enable random number generation circuitry 200 to generate and output more random bits. Control circuitry 230 and/or interface circuitry 250 may then set RNG status bit 7 of RNG configuration register 271 to indicate RBS 210 is active.

For another embodiment, random number generation circuitry 200 may continue to generate and output random bits to interface circuitry 250 regardless of the number of unread random bits stored by interface circuitry 250. Interface circuitry 250 may then ignore excess random bits output from random number generation circuitry 200 and/or may displace unread random bits stored by interface circuitry 250 with newly received random bits.

Interface circuitry 250 and control circuitry 230 for another embodiment disable RBS 210 and DSP 220 when interface circuitry 250 has stored a predetermined number of unread random bits only when RBS run continuous bit 1 of RNG configuration register 271 indicates RBS 210 is to generate random bits only as desired or needed. Otherwise, random number generation circuitry 200 may continue to generate and output random bits to interface circuitry 250 regardless of the number of unread random bits stored by interface circuitry 250.

Control circuitry 230 for one embodiment also disables RBS 210 and DSP 200 when RNG enable bit 0 of RNG configuration register 271 is set to disable RNG 174.

RNG status register 272 is used to indicate whether valid random bits, that is random bits that have not yet been output or read from RNG 174, are stored by interface circuitry 250 and may be read from RNG 174. The bits of RNG status register 272 may be defined in any suitable manner and for one embodiment are defined as follows.

TABLE 2

RNG Status Register

| Bit 7 | Bit 6 | Bit 5 | Bit 4 | Bit 3 | Bit 2 | Bit 1 | Bit 0 |
|---|---|---|---|---|---|---|---|
| Reserved | Reserved | Reserved | Reserved | Reserved | Reserved | Reserved | Validity |

Validity bit 0 indicates whether valid random bits are stored by interface circuitry 250 and may be read from RNG 174. For one embodiment, validity bit 0 is set to logical one to indicate valid random bits are available to be read from RNG 174 and is set to logical zero to indicate no valid random bits are available to be read from RNG 174.

RNG status register 272 for one embodiment has a default value of 00h, that is all bits are set to logical zero, and is set to the default value upon reset or disabling of RNG 174. Interface circuitry 250 for one embodiment allows only read access to RNG status register 272.

RNG status register 272 for other embodiments may comprise one or more other suitable bits to help control the reading of random bits from RNG 174.

Interface circuitry 250 for one embodiment provides a RNG data register interface to read a suitable predetermined number of random bits stored by interface circuitry 250. The bits for one embodiment of the RNG data register interface may be defined in any suitable manner and for one embodiment are defined as follows.

TABLE 3

RNG Data Register Interface

| Bit 7 | Bit 6 | Bit 5 | Bit 4 | Bit 3 | Bit 2 | Bit 1 | Bit 0 |
|---|---|---|---|---|---|---|---|
| Data | Data | Data | Data | Data | Data | Data | Data |

Data bits 0–7 are each a random bit stored by interface circuitry 250. Of data bits 0–7, for one embodiment, data bit 0 is the newest random bit and data bit 7 is the oldest random bit.

The RNG data register interface for one embodiment has a default value of 00h, that is all bits are set to logical zero, and is set to the default value upon reset or disabling of RNG 174. Interface circuitry 250 for one embodiment allows only read access to the RNG data register interface.

Referring to FIG. 3, interface circuitry 250 for one embodiment outputs random bits stored in register 261, 262, 263, or 264 when the RNG data register interface is read.

Interface circuitry 250 for another embodiment may store random bits in a physical RNG data register for output when the RNG data register interface is read. As one example, accumulator 260 may comprise only one shift register to receive and store random bits output by random number generation circuitry 200. That one shift register may serve as a RNG data register, and accumulator 260 may output the random bits stored in the RNG data register when the RNG data register interface is read. Accumulator 260 may alternatively output the random bits from that one shift register to a physical RNG data register and output the random bits stored in the RNG data register when the RNG data register interface is read. As another example, accumulator 260 may control MUX 266 to output the random bits from register 261, 262, 263, or 264 to a physical RNG data register and output the random bits stored in the RNG data register when the RNG data register interface is read.

When interface circuitry 250 has stored a suitable predetermined number of valid random bits available for output through the RNG data register interface, interface circuitry 250 for one embodiment sets validity bit 0 of RNG status register 272 to indicate valid random bits are available to be read from RNG 174. When the RNG data register interface is read, interface circuitry 250 for one embodiment sets validity bit 0 of RNG status register 272 to indicate valid random bits are not available to be read from RNG 174. When a suitable predetermined number of stored random bits are again available for output through the RNG data register interface, interface circuitry 250 may then set validity bit 0 of RNG status register 272 to indicate valid random bits are again available. For another embodiment, interface circuitry 250 may allow validity bit 0 to remain set through more than one read of the RNG data register interface so long as interface circuitry 250 has stored valid random bits available for output through the RNG data register interface.

By setting and resetting validity bit 0 of RNG status register 272, interface circuitry 250 for one embodiment helps prevent valid random bits from being read more than once. Interface circuitry 250 for one embodiment may also prevent valid random bits from being read more than once by actively limiting the number of times the same random bits may be output by interface circuitry 250. Interface circuitry 250 for one embodiment sets the RNG data register interface to a predetermined value, such as all logical zero bits for example, each time the RNG data register interface is read.

For embodiments where interface circuitry 250 comprises a RNG data register, interface circuitry 250 may set validity bit 0 of RNG status register 272 to indicate valid random bits are available to be read when valid random bits are stored in the RNG data register. Each time the RNG data register is read, interface circuitry 250 for one embodiment sets validity bit 0 to indicate valid random bits are not available to be read from RNG 174 and sets the RNG data register to a predetermined value, such as all logical zero bits for example, to prevent the random bits stored in the RNG data register from being read again.

Referring to FIG. 3, interface circuitry 250 for one embodiment sets validity bit 0 of RNG status register 272 to indicate valid random bits are available to be read when accumulator 260 can control MUX 266 to output unread random bits from register 261, 262, 263, or 264.

For one embodiment, interface circuitry 250 fills all four registers 261–264 with random bits and sets validity bit 0 of RNG status register 272 to indicate valid random bits are available to be read. Interface circuitry 250 may optionally signal to control circuitry 230 to disable RBS 210 and DSP 220. When the RNG data register interface is read, accumulator 260 controls MUX 266 to output the random bits from register 264, for example. Because valid random bits remain stored in registers 261–263, interface circuitry 250 for one embodiment may allow validity bit 0 of RNG status register 272 to remain set to indicate valid random bits are available to be read. When the RNG data register interface is next read, accumulator 260 controls MUX 266 to output the random bits from register 263, for example. Interface circuitry 250 continues to output random bits in this manner until random bits from all four registers 261–264 have been output. Interface circuitry 250 sets validity bit 0 of RNG status register 272 to indicate no valid random bits are available for output, fills all four registers 261–264 with random bits, and sets validity bit 0 of RNG status register 272 to indicate valid random bits are available for output. Interface circuitry 250 may optionally signal to control circuitry 230 to enable RBS 210 and DSP 220 as desired or needed.

Each time the RNG data register interface is read, interface circuitry 250 for one embodiment sets the RNG data register interface to a predetermined value, such as all logical zero bits for example, to prevent the same random bits from being read more than once. Interface circuitry 250 for one embodiment may also control MUX 266 to output valid random bits from any one register 261–264 only once.

For another embodiment, interface circuitry 250 fills each register 261–264 one register at a time while controlling MUX 266 to output valid random bits from any one register. Interface circuitry 250 for one embodiment allows validity bit 0 of RNG status register 272 to remain set to indicate valid random bits are available when any one register 261–264 is filled with valid random bits. Interface circuitry 250 sets validity bit 0 of RNG status register 272 to indicate no valid random bits are available for output when none of registers 261–264 are filled with valid random bits. Interface circuitry 250 may optionally signal to control circuitry 230 to enable and disable RBS 210 and DSP 220 based on the number of valid random bits stored by accumulator 260.

Hardware Random Number Generator Usage

Interface circuitry 250 provides an interface to enable access to stored random bits to any suitable integrated circuit device. For computer system 100 of FIG. 1, for example, interface circuitry 250 provides an interface to enable access to random bits by processor 102 and/or processor 104 through MCH 130 and ICH 140. Processor 102 and/or processor 104 for one embodiment may execute one or more instructions of a suitable security driver stored in main memory 132, for example, to access random bits from RNG 174.

Figure 4:
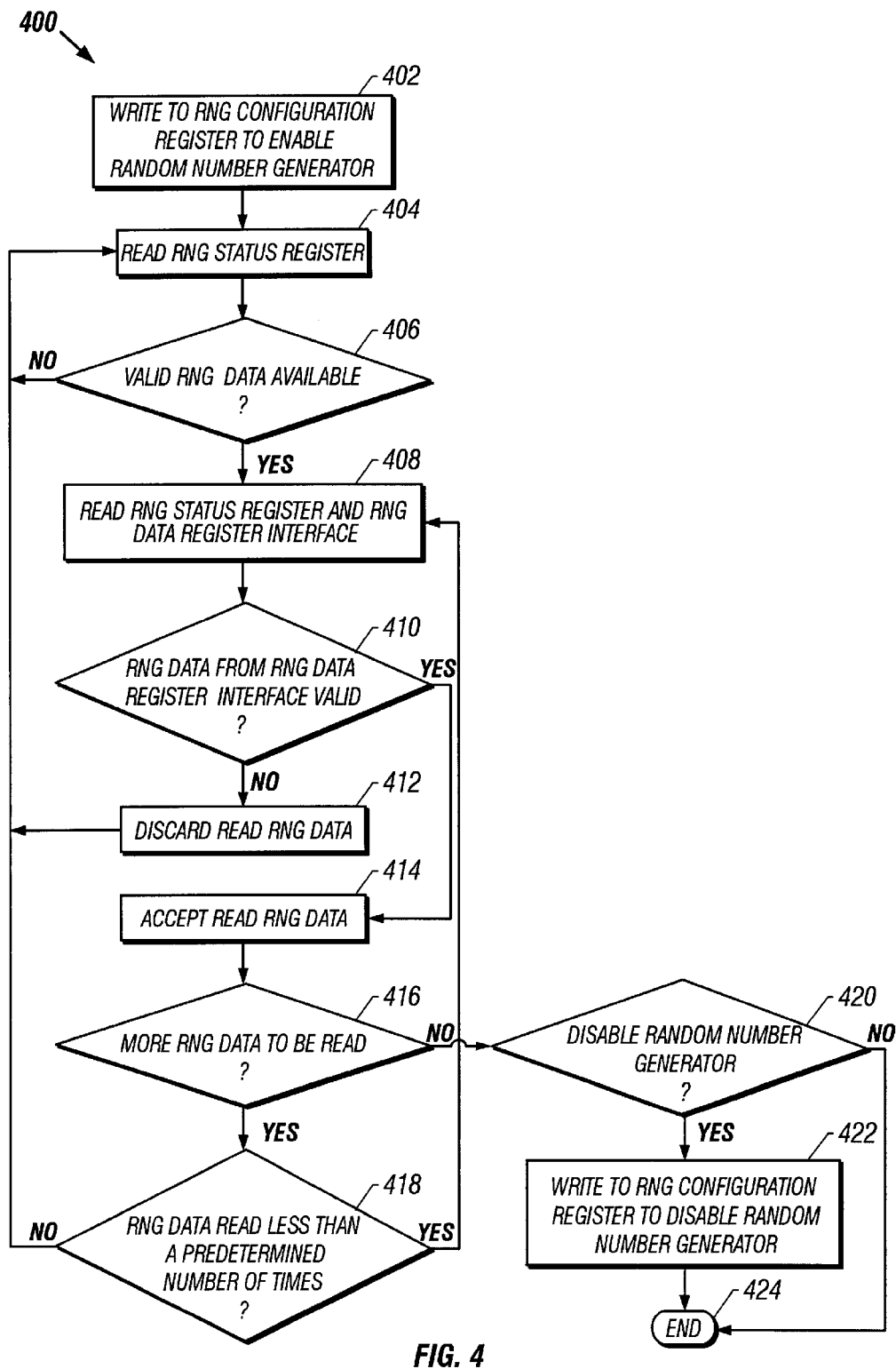
FIG. 4 illustrates, for one embodiment, a flow diagram for reading random bits generated by a hardware random number generator.

Random bits may be read from RNG 174 in any suitable manner. Random bits may be read from RNG 174 for one embodiment in accordance with a flow diagram 400 as illustrated in FIG. 4. Although described in connection with processor 102, any suitable integrated circuit device may read random bits from RNG 174.

Processor 102 initially enables RNG 174. For one embodiment, processor 102 for block 402 of FIG. 4 addresses RNG configuration register 271 to set RNG enable bit 0 to enable RNG 174. Prior to enabling RNG 174, processor 102 may verify RNG 174 is present. Processor 102 for one embodiment may address RNG configuration register 271 to read RNG present bit 6.

In addition to enabling RNG 174, processor 102 for one embodiment may also address RNG configuration register 271 to set RBS run continuous bit 1 to indicate RBS 210 is to generate random bits continuously or is to generate random bits only as desired or needed. Processor 102 for one embodiment may also perform an initial read from RNG 174 to set the RNG data register interface to a predetermined value, such as all logical zero bits for example. Processor 102 for one embodiment may also exercise RNG 174 to verify RNG 174 is indeed present and functioning properly. Processor 102 for one embodiment may read random bits from RNG 174 and perform one or more suitable random number validation tests such as, for example, one or more tests specified by the Federal Information Processing Standard (FIPS) 140-1 specification issued by the National Institute of Standards and Technology of the United States Department of Commerce.

Processor 102 determines whether any valid random bits are available for output from RNG 174. For one embodiment, processor 102 for block 404 addresses RNG status register 272 to read validity bit 0 and for block 406 determines whether valid random bits are available for output from RNG 174 based on validity bit 0. If valid random bits are not available for output as determined for block 406, processor 102 repeats blocks 404 and 406 until valid random bits are available for output from RNG 174. Processor 102 for one embodiment waits a suitable predetermined timeout period each time processor 102 polls RNG status register 272 to allow RNG 174 to generate random bits available for output.

When valid random bits are available for output from RNG 174, processor 102 reads random bits from RNG 174. As processor 102 reads random bits from RNG 174, processor 102 for one embodiment may also determine whether the read random bits are valid. For one embodiment, processor 102 for block 408 addresses RNG status register 272 to read validity bit 0 and addresses the RNG data register interface to read a suitable predetermined number of random bits. Processor 102 for block 410 determines whether the read random bits are valid based on validity bit 0. If the random bits are not valid, processor 102 for block 412 discards the read random bits. Otherwise, processor 102 accepts the read random bits for block 414.

Processor 102 for one embodiment determines whether the read random bits are valid for blocks 408–410 in the event another integrated circuit device read random bits from RNG 174 since block 404. Processor 102 for one embodiment for block 408 reads RNG status register 272 and the RNG data register interface in a single atomic read transaction. A single atomic read transaction may require one or more clock cycles depending, for example, on the width of the physical bus over which RNG status register 272 and the RNG data register interface are read. RNG status register 272 and the RNG data register interface for one embodiment are mapped in consecutive address spaces to help processor 102 read both registers in a single atomic read transaction. For embodiment where RNG status register 272 and the RNG data register interface are each eight bits in size, processor 102 performs a sixteen bit word read transaction to read both RNG status register 272 and the RNG data register interface atomically.

For another embodiment, interface circuitry 250 may provide a RNG data register interface that includes a validity bit to indicate whether random bits available for output through the RNG data register interface are valid. In this manner, the validity bit may be read each time the RNG data register interface is read.

If processor 102 for block 416 is to read more random bits from RNG 174, processor 102 similarly reads more random bits from RNG 174. Processor 102 for one embodiment repeats blocks 408–416 until processor 102 is not to read more random bits from RNG 174.

Where interface circuitry 250 outputs all available random bits prior to storing any new random bits and processor 102 is to read more random bits than are made available for output by interface circuitry 250, processor 102 for one embodiment repeats blocks 408–416 until the random bits made available for output have been read. For one embodiment where processor 102 reads random bits from one of a predetermined number of registers at a time, such as from one of four registers 261–264 for example, processor 102 repeats blocks 408–416 to read random bits from RNG 174 that predetermined number of times, that is once from each register, until each register has been read as determined for block 418. Processor 102 then repeats blocks 404–406 to allow RNG 174 to generate more random bits available for output and repeats blocks 408–416 to read more random bits.

For multithreaded applications executed by processor 102, each thread for one embodiment performs at least blocks 404–418 as a critical section of code to prevent one thread from reading RNG status register 272 while another thread is reading the RNG data register interface.

For another embodiment, in lieu of blocks 404–418, processor 102 may determine whether any valid random bits are available for output from RNG 174 similarly as for blocks 404–406, read random bits from RNG 174, and continue polling for and reading random bits in this manner until processor 102 is not to read any more random bits as for block 416. For multithreaded applications executed by processor 102, each thread for one embodiment reads random bits from RNG 174 in this manner as a critical section of code.

If processor 102 for block 416 is not to read more random bits from RNG 174, processor 102 may optionally disable RNG 174. If processor 102 for block 420 is to disable RNG 174, processor 102 for one embodiment addresses RNG configuration register 271 to set RNG enable bit 0 to disable RNG 174 for block 422. Flow diagram 400 ends for block 424.

Processor 102 may read random bits from RNG 174 any suitable number of times for any suitable purpose. Processor 102 for one embodiment may combine the random bits read from RNG 174 to form a random number of any suitable size, such as 32-bits, 40-bits, 56-bits, 64-bits or 128-bits for example, for use for cryptography, digital signatures, and protected communication protocols, for example.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. An apparatus comprising:
   random number generation circuitry to generate and output random bits; and
   interface circuitry to receive and store the random bits output by the random number generation circuitry and to output the random bits, the interface circuitry to prevent outputting a same set of random bits more than once.

2. The apparatus of claim 1, wherein the interface circuitry indicates whether valid random bits are available to output.

3. The apparatus of claim 2, wherein the interface circuitry comprises a status register to store a validity bit indicating whether valid random bits are available to output.

4. The apparatus of claim 1, wherein the interface circuitry outputs random bits through a data register interface and sets the data register interface to a predetermined value when the data register interface is read.

5. The apparatus of claim 1, wherein the random number generation circuitry generates the random bits based on semiconductor or thermal noise.

6. The apparatus of claim 1, wherein the interface circuitry comprises one or more registers to store the random bits.

7. The apparatus of claim 6, wherein the interface circuitry comprises a plurality of registers to store the random bits and a multiplexer to output the random bits from one of the registers at a time.

8. A method comprising:
   determining whether a random number generator has valid random bits available to output; and
   reading the random bits from interface circuitry at the random number generator, the interface circuitry to prevent outputting a same set of random bits more than once.

9. The method of claim 8, wherein the determining comprises reading a validity bit from the random number generator.

10. The method of claim 8, wherein the determining comprises reading a validity bit from the random number generator, and wherein the reading random bits comprises reading the random bits during a same atomic read transaction while reading the validity bit.

11. The method of claim 8, comprising enabling the random number generator to generate the random numbers.

12. The method of claim 8, comprising repeating the determining and the reading and forming a random number from the read random bits.

13. An apparatus comprising:
   a random number generator to generate random bits, the random number generator including:

interface circuitry coupled to an input/output controller hub to receive and output the random bits, and to prevent outputting a same set of random bits more than once; and random number generation circuitry coupled to the interface circuitry to generate and output the random bits to the interface circuitry; and a memory coupled to the random number generator to store one or more of system software and video software.

14. The apparatus of claim 13 wherein the random number generation circuitry generates random bits based on one or more of a semiconductor noise and a thermal noise.

15. The apparatus of claim 13 wherein the random number generation circuitry includes:

a random bit source to generate and output the random bits;

a digital signal processor coupled to the random bit source to receive and process the random bits and output the processed bits to the interface circuitry; and a control circuitry coupled to the random bit source and the digital signal processor to provide a control function to the random bit source and the digital signal processor.

16. The apparatus of claim 13 wherein the interface circuitry includes:

an accumulator to receive and store the random bits output from the random number generation circuitry and output the stored random bits; and a plurality of registers to assist in generation and reading of the random bits.

17. The apparatus of claim 16 wherein the plurality of registers are selected from a group comprising a status register and a configuration register.

18. The apparatus of claim 13 wherein the interface circuitry includes a status register to store a validity bit indicating whether valid random bits are available to output.

19. The apparatus of claim 13 wherein the interface circuitry outputs random bits through a data register interface and sets the data register interface to a predetermined value when the data register interface is read.

20. The apparatus of claim 13 wherein the random number generator outputs the random bits to the memory.

21. The apparatus of claim 13 wherein the memory includes flash memory.

22. The apparatus of claim 13 wherein the memory and the random number generator are integrated on a same chip.

23. The apparatus of claim 13 wherein the interface circuitry indicates whether valid random bits are available to output.

24. The apparatus of claim 13 wherein the random number generation circuitry generates random bits based on one or more of a semiconductor noise and a thermal noise.

* * * * *